United States Patent [19]

Lewus

[11] Patent Number: 4,734,601
[45] Date of Patent: Mar. 29, 1988

[54] NOISE SUPPRESSION CIRCUIT FOR PARALLEL RESONANT MOTOR

[76] Inventor: Alexander J. Lewus, 9844 N. 11th Ave., Phoenix, Ariz. 85021

[21] Appl. No.: 88,241

[22] Filed: Aug. 24, 1987

[51] Int. Cl.⁴ .................. H02K 11/00; H02P 1/44
[52] U.S. Cl. ........................ 310/68 E; 318/793; 318/795
[58] Field of Search .......... 310/68 R, 68 E; 318/729, 749, 785, 786, 787, 789, 790, 793, 794, 795, 817

[56] References Cited

U.S. PATENT DOCUMENTS

| | | |
|---|---|---|
| 1,882,733 | 10/1932 | Ballman . |
| 2,028,230 | 1/1936 | Lyden ........................ 318/795 |
| 2,034,950 | 3/1936 | Lyden ........................ 318/795 |
| 2,630,540 | 3/1953 | Hewlett, Jr. ................ 310/112 |
| 2,836,780 | 5/1958 | List, Jr. et al. ............ 318/795 |
| 2,922,943 | 1/1960 | Rupp ........................ 318/254 |
| 3,036,255 | 5/1962 | Lewus ........................ 318/221 |
| 3,573,579 | 4/1971 | Lewus ........................ 318/221 |
| 3,916,274 | 10/1975 | Lewus ........................ 318/221 |
| 4,348,626 | 9/1982 | London ...................... 318/785 |
| 4,642,545 | 2/1987 | Lewus ........................ 318/795 |
| 4,675,565 | 6/1987 | Lewus ........................ 310/68 E |

Primary Examiner—Patrick R. Salce
Assistant Examiner—D. L. Rebsch
Attorney, Agent, or Firm—LaValle D. Ptak

[57] ABSTRACT

A noise suppression circuit is provided for an alternating current motor which has a capacitor connected in parallel with one of the windings to form an LC resonant circuit at the operating frequency of the motor. The motor includes first and second windings of substantially the same wire size connected in series on the stator core. The LC resonant circuit formed by the capacitor and the winding across which it is connected improves the efficiency of operation of the motor. To prevent chattering and noise from occuring upon disconnection of power from the windings, separate switches are used for applying alternating current power to the windings and to the capacitor; so that when power is disconnected, the capacitor is isolated from the winding across which it is connected. At the same time, a power dissipation resistor connected in parallel with the capacitor permits it to discharge.

19 Claims, 9 Drawing Figures

NOISE SUPPRESSION CIRCUIT FOR PARALLEL RESONANT MOTOR

RELATED APPLICATION AND PATENT

This application is related to co-pending application Ser. No. 855,935 filed on Apr. 25, 1986, now abandoned, and to U.S. Pat. No. 4,675,565 issued on June 23, 1987.

BACKGROUND

Single-phase alternating current electric motors conventionally are provided with two windings on a stator core, inductively coupled to the rotor of the motor. Such motors are widely used for a variety of different purposes and range in size from very small fractional horse-power motors on up to multiple horse-power sizes. Single-phase motors are particularly popular since most home and business alternating current supplies are in the form of single-phase power supplies.

Electric motors typically include a stator, which is wound with start windings and run windings connected to the source of operating power. The stator windings surround a rotor, which rotates a shaft to produce the motor output. Rotors are made in a number of different configurations, such as squirrel cage rotors, high resistance rotors, low resistance rotors, wound rotors or multiple winding high and low resistance rotors. All of these configurations, along with various stator winding arrangements, are well known in the electric motor industry. Typically the start winding is made of relatively small diameter wire and the run winding is made of relatively large diameter wire, compared to the diameter of the start winding. These windings are angularly displaced from one another on the stator.

The above identified co-pending application is directed to a modified electric motor which does not employ switches in the starting circuit, but which instead utilizes two series-connected windings (of substantially the same diameter heavy wire) electrically phase displaced 90° from one another on the stator core. One of these windings has a capacitor connected in parallel with it to form a parallel resonant circuit at the operating frequency of the motor. The motor of this co-pending application is a high efficiency motor which overcomes most of the disadvantages of prior art capacitor start/capacitor run motors. One disadvantage, however, which is present in the motor in the above-identified co-pending application is that the starting torque of the motor is relatively low. As a consequence, applications for the motor of applicant's co-pending application are primarily for situations which do not require a very high starting torque, such a pumps, blowers, machine tools and many commercial and domestic appliances.

A motor which has the advantages of the parallel resonant motor of the above-identified co-pending application and which further is capable of producing high starting torque to permit use of such a parallel resonant motor in applications where high starting torque is necessary is disclosed in the above-identified U.S. Pat. No. 4,675,565. The motor of this patent employs the same basic resonant circuit disclosed in the above-identified co-pending application. In addition, however, a starting capacitor is connected in series with a switch in parallel with the capacitor forming a portion of the LC resonant circuit for the motor. This switch is closed during start-up of the motor and is opened during normal load conditions of operation of the motor once the motor has attained its operating speed. The motor of U.S. Pat. No. 4,675,565 produces efficiency similar to the motor of the co-pending application, but is capable of use in situations where high starting torque is desired. The motor of U.S. Pat. No. 4,675,565 is similar to the one of the co-pending application inasmuch as no separate start winding is switched into and out of the circuit during the motor operation. Both the start and run windings are continuously connected in series circuit throughout both the starting and run operation sequences of the motor. Only the starting capacitor is switched out of the circuit upon attainment of operating speed of the motor.

For larger horse-power motors, the capacitor discharge of the LC resonant circuit capacitor when the motor is turned off or switched off creates undesirable noise and chattering or vibration of the rotor. This results from the discharge of the capacitor through the winding across which it is connected.

It is desirable to provide a motor which has the advantages of the parallel resonant motors of the above-identified co-pending application and patent, and which further does not have the disadvantages of noise and chattering when the motor is turned off.

SUMMARY OF THE INVENTION

Accordingly, it is an object of this invention to provide an improved alternating current motor.

It is an additional object of this invention to provide an improved alternating current motor operated from a single-phase alternating current power source.

It is another object of this invention to provide an improved single-phase alternating current motor which operates at high efficiency, with low starting current and low running current.

It is a further object of this invention to provide a parallel resonant alternating current motor which has an LC resonant circuit, including a capacitor connected across one of the motor windings, which has a provision for silient motor turn-off upon disconnection from the power supply.

It is yet another object of this invention to provide an improved LC resonant alternating current motor with a provision for preventing capacitor discharge of the capacitor in the LC motor through the motor windings when the motor is turned-off by isolating the capacitor from the motor within a fraction of a second after turn-off.

In accordance with a preferred embodiment of this invention, an alternating current motor operated from a source of single-phase alternating current power has first and second series-connected windings on a stator core and inductively coupled to a rotor. First and second switches are provided, and one of these switches is used to apply alternating current power from a source of alternating current power to the series-connected windings. The other of the switches is used to apply alternating current power from the source of power to the capacitor, and both switches are closed during the starting and operating conditions of operation of the motor. A power dissipation member is connected across the capacitor terminals, and the arrangement of the first and second switches is such that when the switches are opened, the capacitor is eletrically isolated from the motor windings, while the power dissipation member is connected across the capacitor to permit the capacitor to discharge through the power dissipation member. At the same time, discharge of the capacitor through the motor windings is prevented.

DETAILED DESCRIPTION

Reference now should be made to the drawings, where the same reference numbers are used in the different figures to designate the same or similar components.

Figure 1:
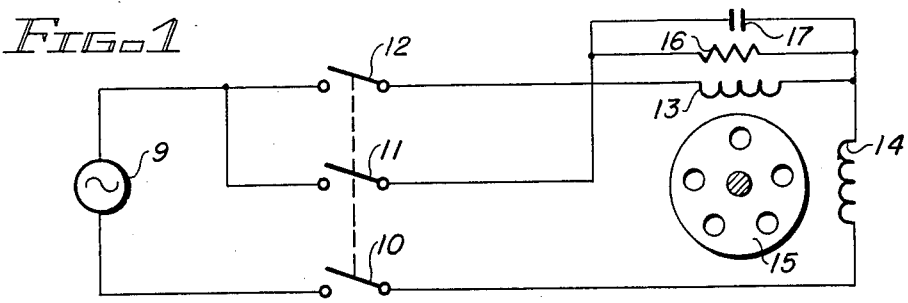
FIG. 1 is a schematic diagram of a preferred embodiment of a motor according to the invention.

FIG. 1 is a schematic diagram of a variation of the motor shown in FIG. 1 of applicant's co-pending application. This is a two-phase motor adapted to be operated from a single-phase alternating current source 9. In FIG. 1, alternating current power is supplied from the power source 9 through a three-pole single throw power switch 10, 11 and 12. A pair of windings 13 and 14 are wound on the stator core with substantially 90° electrical angular displacement between them, and these windings are connected in series with one another across the power input terminals 10 and 12 of the switch.

Although the winding 13 may be designated as a "start" winding and the winding 14 may be designated as a "run" winding, the two windings are essentially the same. Both windings 13 and 14 typically are wound from relatively heavy wire (of a gauge commonly used for the run winding of such electric motors), so that the characteristics of the two windings 13 and 14 are similar. For some motor designs, the "start" winding 13 may be one or two sizes smaller than the "run" winding 14.

A capacitor 17, with an energy dissipation resistor 16 connected across it, is connected in parallel with the winding 13. The capacitor 17 and the winding 13 form a parallel LC resonant circuit, the resonance of which is selected to be at or near the 60 Hz frequency of the power supply 9. Obviously if power supplies of different frequencies, such as 50 Hz or 120 Hz are used, the resonance of the LC parallel resonant circuit, consisting of the winding 13 and the capacitor 17, is selected to match the frequency of the source 9. The capacitor 17 is an alternating current nonpolarized capacitor, and may be an electrolytic non-polarized capacitor. It is noted that when the ganged switch contacts of the switch 10, 11 and 12 are closed, the capacitor 17 is connected directly in parallel with or across the winding 13.

The windings 13 and 14 are inductively coupled to a rotor 15 which may have any one of a number of different standard configurations. For example, the rotor 15 may be a squirrel cage rotor, a high resistance rotor, a low resistance rotor, a wound rotor, or a multiple two winding high and low resistance rotor. The manner of operation of the basic circuit which is disclosed in FIG. 1 is described in detail in my co-pending application to which reference should be made for such detailed operation. The operation of the circuit of FIG. 1 is identical of the operation of the circuit of FIG. 1 of the co-pending application during the time the switch contacts 10, 11 and 12 are closed.

When it is desired to turn off or disconnect the motor of FIG. 1 from the power supply 9, the switch 10, 11 and 12 is opened to the position shown in FIG. 1. When this occurs, the separate switch contacts 11 and 12 disconnect the capacitor 17 and the series-connected windings 13 and 14 from the power supply 9. Because of the manner in which the switches 11 and 12 separately connect the capacitor 17 and the winding 13 to the power supply 9, opening of the contacts 11 and 12 also disconnects or electrically isolates the capacitor 17 from the winding 13. This prevents the capacitor 17 from discharging in any way into the winding 13 when the motor is turned off. To provide a discharge path for any charge stored on the capacitor 17, however, the high impedance resistor 16 is provided. The resistance of the resistor 16 is selected to be sufficiently high that it has substantially no effect on the operation of the resonant circuit formed by the winding 13 and the capacitor 17 during start up and operating conditions of operation of the motor. After a relatively short period of time following the opening of the switch contacts 11 and 12, however, the capacitor 17 fully discharges through the resistor 16; and the motor is in its standby state of operation in preparation for the next time the switch contacts 10, 11 and 12 are closed.

It should be noted that although a three-pole switch (or 3 ganged switches) is illustrated in FIG. 1, the ground or return side of the system interconnecting the winding 14 with the power supply 9 through the switch 10 could be permanently closed if desired. An additional margin of safety, however, is provided by using a three-pole switch or three switches comprising the contacts 10, 11 and 12 instead of a two-pole switch or two switches consisting of the contacts 11 and 12 only.

Figure 2:
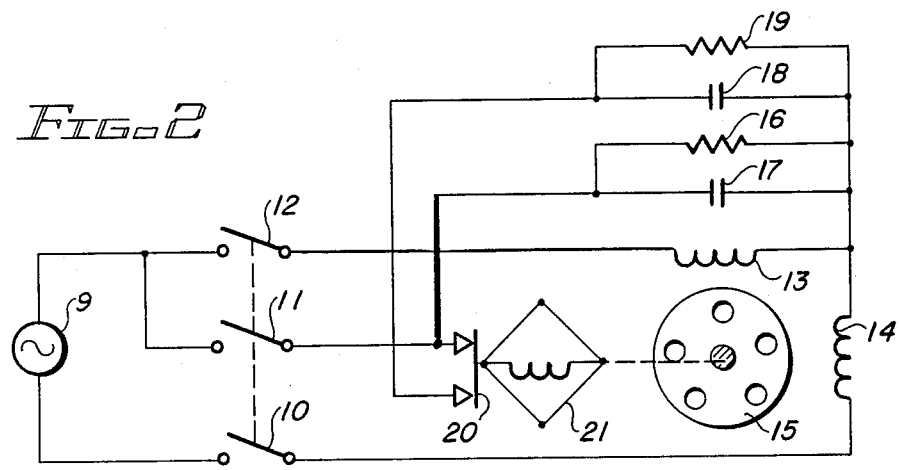
FIG. 2 is a schematic diagram of another preferred embodiment of a motor according to the invention.

FIG. 2 is a schematic diagram of another embodiment of the invention which is similar to FIG. 1 of the above identified U.S. Pat. No. 4,675,565. The components of FIG. 2 which have the same reference numbers as used above in the description of FIG. 1, operate in the same manner in FIG. 2 as they do in FIG. 1. The circuit of FIG. 2, however, is modified by the addition of a second or start capacitor 18, with an energy dissipating resistor 19 connected across it, for the purpose of providing high start up torque for applications which require such characteristics. The second or additional capacitor 18 typically is nonpolarized AC electrolytic type of capacitor and is connected across or in parallel with the winding 13 (and across the capacitor 17) through the normally closed contacts of a starting switch 20.

The result of the second capacitor 18 in parallel circuit with the capacitor 17 is to cause the phase displacement of the currents through the windings 13 and 14 to be in the vicinity of 90° phase displacement during motor starting conditions. In addition, the overall current demand of the motor at start up is greater than with the motor of the circuit of FIG. 1. Once the motor of FIG. 2 attains or approaches normal operating speed, a centrifugal switch operator 21, coupled to the rotor 15 in a conventional manner, opens the contacts 20 and removes the capacitor 18 from the circuit. The energy dissipating resistor 19, connected across the capacitor 18, dissipates any energy stored in the capacitor 18 at the time the switch 20 opens. This condition of operation is maintained throughout the normal run condition of the motor.

When the motor of FIG. 2 is to be turned off, the switch contacts 10, 11 and 12 are opened, the isolation of the capacitor 17 from the winding 13 is effected, and the discharge of the capacitor 17 through the energy dissipating resistor 16 takes place in the same manner described above in conjunction with FIG. 1.

Figure 3:
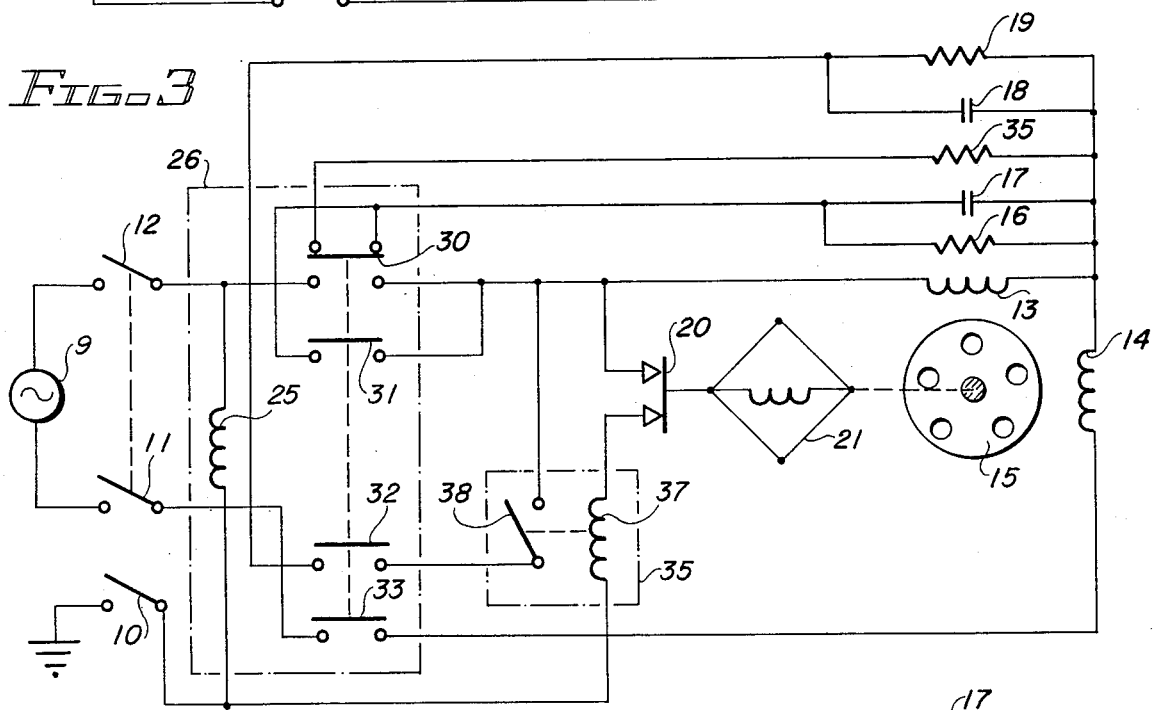
FIGS. 3 through 6 are schematic diagrams of other embodiments of motors according to variations of the invention shown in FIGS. 1 and 2.

FIG. 3 is a variation of the circuit shown in FIG. 2. This circuit uses a single-pole switch 10 and a two-pole switch 11, 12. Initial closure of the switches 10, 11 and 12, however, simply connects an operating winding 25 of an alternating current magnetic relay 26 across the alternating current power supply 9. The winding 25 then is used to move four sets of contacts 30, 31, 32, and 33 from the normal released position shown in FIG. 3 to a lower operated position. In the operated position, the switch contacts 30 and 31 operate in a manner comparable to the switch contacts 11 and 12 of FIGS. 1 and 2 to operatively interconnect the winding 13 and capacitor 17 in parallel with one another and in series with the power supply 9 through the contact 12 of FIG. 3. At this time, current also is supplied through the now closed contact 30 and the closed contacts 20 to the operating winding 37 of a relay switch 35 to close a contact 38, which is in series with a lower set of now closed contacts 32. This connects the starting capacitor 18 in parallel circuit with the LC resonant capacitor 17. A lower set of contacts 33 completes the operating circuit from the winding 14 back to the power supply 9 through the contacts 11.

The two-pole switch 11 and 12 is used to connect the high voltage power supply 9 to the capacitor circuits and the motor windings 13 and 14 through the contacts 30, 31, 32 and 33 of the magnetic switch operated by the winding 25. The single-pole switch 10 is a grounded low voltage circuit which is isolated from the high voltage source, since the capacitors 17 and 18, and the motor windings 13 and 14 are not connected to ground. Only the operating windings or relay coils 25 and 37 are connected to ground through the switch 10, so that low voltage windings 25 and 37 may be used to operate the respective relay contacts associated with those windings without interferring with the high voltage circuit connected to the motor windings 13 and 14 and the capacitors 17 and 18.

Upon attainment of operating speed, the centrifugal switch 21 opens the contacts 20. This in turn removes operating current from the coil 37 to open the switch 38 to open the circuit for the starting capacitor 18. Energy stored in the capacitor 18 then is dissipated through the resistor 19. The circuit remains in this condition of operation until the switch 10, or the switches 11 and 12 once again are opened. When this occurs, operating power is removed from the coil 25 and the switch contacts 30, 31, 32 and 33 return to the position shown in FIG. 3. This connects an additional energy dissipation resistor 35 in parallel with the LC resonant capacitor 17 through the upper set of contacts for the switch 30. The resistor 35 may be used in conjunction with the resistor 16, as shown, or the resistor 35 may constitute the only energy dissipation resistor used for discharging the capacitor 17. The circuit of FIG. 3 isolates the capacitor 17 from the coil 13 when the switches 10, 11 and 12 are opened, to prevent any discharge of the capacitor 17 from taking place through the winding 13.

It should be noted with the circuit of FIG. 3, turning the motor on and off may be effected solely by operation of the single-pole switch 10 with the switches 11 and 12 remaining in their closed position. This is a very practical arrangement since the switch 10 is in a low voltage circuit, as explained above and simply operates to complete and open the operating circuit paths through the low voltage relay operating windings 25 and 37. If the switch 10 is opened while the switches 11 and 12 are closed, operating current through the relay coil 25 terminates, as described above. The switch contacts 30, 31, 32 and 33 then move to the uppermost position as shown in FIG. 3. In this position the discharge of the capacitor 17 or the capacitors 17 and 18 takes place as described above and the discharge paths for these capacitors are completely isolated from the motor windings 13 and 14. Similarly, if desired, the motor may be turned off by opening the double-pole switches 11 and 12 to disconnect the system from the high voltage power supply 9. This also removes operating current through the winding 25 to cause the contacts 30, 31, 32 and 33 to assume the uppermost position shown in the drawing and described above. The circuit arrangement of FIG. 3 is a practical one, since three wire, single phase power is readily available providing 240 volts and 120 volts power. The high voltage power is provided from the source 9 through the double-pole switches 11 and 12, while the low voltage (120 volt) power is provided through the switch 10 and the winding 25.

Figure 4:
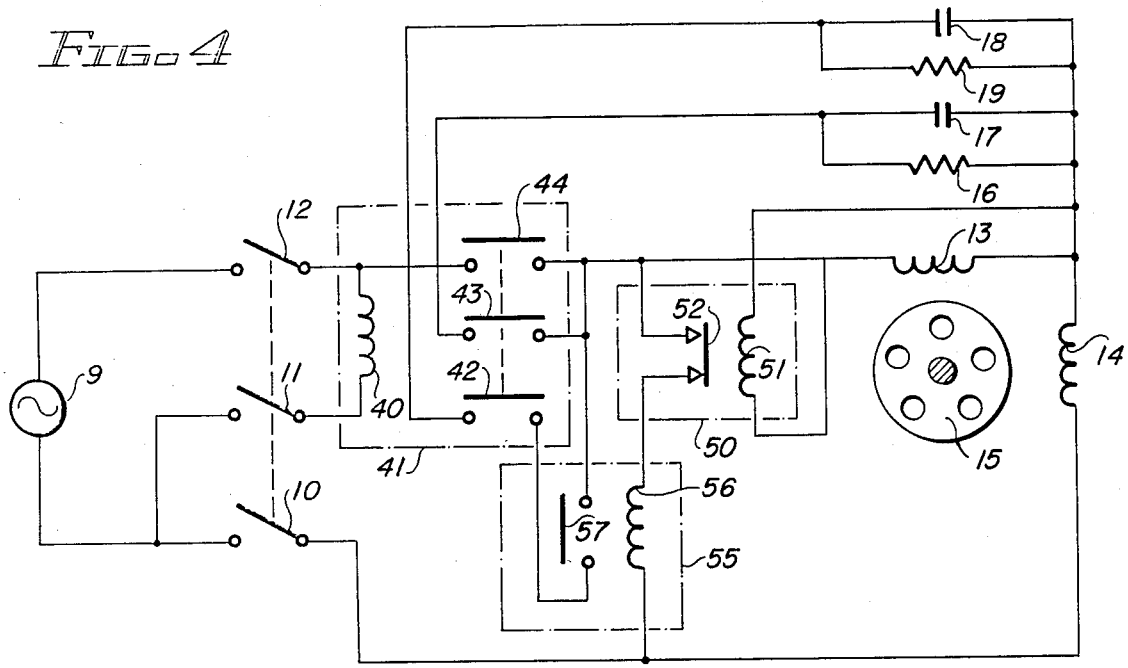

FIG. 4 is another variation of the circuit shown in FIG. 2; but instead of using a centrifugal switch 21 to open the circuit of a starting capacitor 18, a voltage controlled relay 50 is employed. As with the circuit of FIG. 3, closure of the switches 10, 11 and 12 initially applies operating current through the operating coil 40 of an AC relay 41. When the coil 40 is energized, three contact sets 42, 43 and 44 are moved from the open position shown in FIG. 4 to a closed position. The contact 44 applies alternating current power from the source 9 to the winding 13. The contact 43 applies operating power from the source 9 through the contact 44 to the LC resonant capacitor 17, so that the capacitor 17 and the coil 13 are connected in parallel during operation of the motor. Closure of the lower contact set 42 prepares the circuit for interconnecting the starting capacitor 18 in parallel with the capacitor 17 and winding 13. This occurs almost instantaneously, but current initially flows through the closed contacts 52 from the closed upper contact set 44 through the operating coil 56 of a large power relay 55 to close an associated contact pair 57. This then completes a circuit from the closed contacts 44 through the contacts 57 and closed contacts 42 to interconnect the starting capacitor 18 in the circuit. This is the condition during the start up phase of operation of the motor of FIG. 4.

Upon attainment of operating speed, a voltage sensitive motor starting relay 51 is energized and causes the contacts 52 to be opened. This removes the operating current through the coil 56, so that the contacts 57 open. The starting capacitor 18 then is disconnected from the circuit; and any energy stored in the capacitor 18 is dissipated through the resistor 19, as described previously. The circuit of FIG. 4 otherwise operates in the same manner as the circuit of FIG. 3.

When the switch contacts 10, 11 and 12 of FIG. 4 are opened, operating current through the relay coil 40 is instantly removed and the switch contacts 42, 43 and 44 resume the position shown in FIG. 4. This causes the current paths for the capacitor 17 and the windings 13 and 14 to be opened and disconnected from one another, so that the LC resonant circuit capacitor 17 discharges through the energy dissipating resistor 16.

Figure 5:
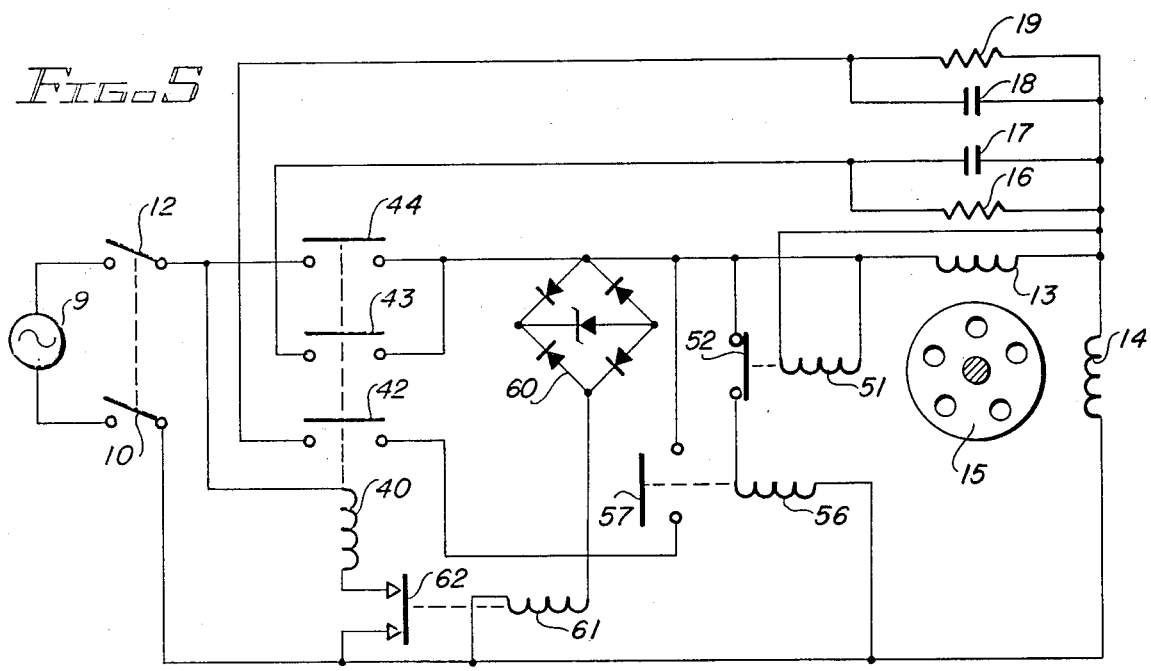

FIG. 5 is another variation of the circuit of FIG. 2 which is similar to the circuit of FIG. 4. A Zener diode circuit 60, however, is used to control the connection and disconnection of the starting capacitor 18 instantly in the circuit. The circuit of FIG. 5 typically is used for larger horse power motors, such as five horse-power or greater. Closure of the switch contacts 10 and 12 (the third pole or switch 11 has been eliminated in this embodiment) causes operating current to be applied through the winding 40 and through a normally closed contact set 62. This causes closure of the contacts 42, 43 and 44 to be effected in the same manner as described above in conjunction with FIG. 4. A Zener diode 60 constitutes a very high impedance in series with an operating coil 61 for the contacts 62 across the terminals of the power supply 9 during the motor run and operating circuit conditions. Consequently, insufficient current flows through the coil 61 to open the contacts 62 and the circuit functions as if the Zener diode circuit constituted an open circuit. The voltage sensitive relay 51, 52 and the power relay 56 and 57 operate in the same manner described above in conjunction with FIG. 4.

Upon motor disconnect, initially effected by opening the switch contacts 10 and 12, the circuit of FIG. 5 operates in the same manner as the circuit of FIG. 4. In addition, any high voltage discharge which tends to take place from the capacitor 17 across the opening contacts 44 causes an instantaneous high voltage to appear across the Zener diode 60 resulting in current flow through the operating coil 61 to open the contacts 62 instantly. This insures that such high voltage discharge does not continue to flow through the operating winding 40 and enhances or speeds up the drop out of the operation of the relay coil 40 to complete the opening of the contacts 42, 43 and 44 instantly within a fractional part of a second.

Figure 6:
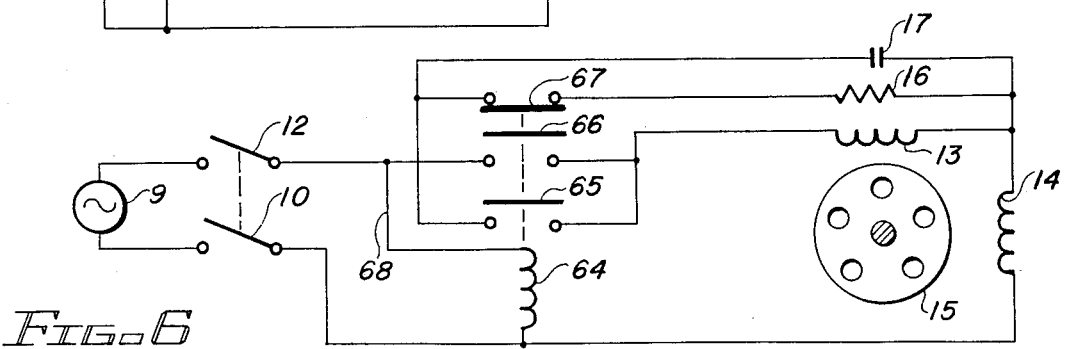

FIG. 6 is a variation of the circuit of FIG. 1, employing some of the techniques illustrated in the circuit of FIG. 3 to connect the energy dissipating resistor 16 (of FIG. 6) across the capacitor 17 only during the turn off or discharge time of the capacitor 17. This is accomplished by using a switch pair 10 and 12 connected across the power supply 9. Initial closure of the switch contacts 10 and 12 of FIG. 6 applies operating current through a switch 68 in series with an AC relay coil 64 to close lower contact sets 65 and 66 and to open an upper contact set 67. Operation of the motor of FIG. 6 in this condition is identical to the operation discribed in conjunction with FIG. 1. When either the switch 68 is opened or the contacts 10 and 12 are opened, the coil 64 no longer is energized and the contact sets 65, 66 and 67 are released to the position shown in FIG. 6. This disconnects the capacitor 17 and the coil 13 from the power supply 9 and from one another, as described previously. At the same time, the contacts 67 are closed to connect the energy dissipating resistor 16 in parallel with the capacitor 17 to effect discharge of the capacitor 17.

In all of the embodiments described above in conjunction with FIGS. 1 through 6, the capacitor 17 of the LC resonant circuit is disconnected or electrically isolated from the coil 13 when the motor is switched off. This prevents the capacitor 17 from discharging in any manner through the coil 13 or into the coil circuit of the series-connected coils 13 and 14. All of the energy which is present in the capacitor 17 at the time the motor is switched off, is dissipated through the resistor 16 or through the resistors 16 and 35 (in the case of the embodiment of FIG. 3). As a result, no capacitor "noise" is heard, and there is no chattering or erratic operation of the rotor 15 of the motor at the time the motor is switched off. This is true of all the embodiments through the unique switching arrangements which are employed.

Figure 7:
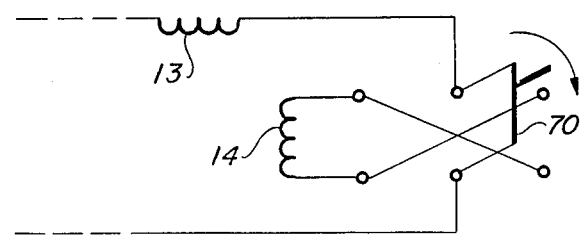
FIG. 7 illustrates a feature which may be employed with any of the embodiments.

FIG. 7 illustrates a circuit interconnection which may be utilized in all of the illustrated embodiments to interconnect the windings 13 and 14 with one another. A double-pole double-throw switch 70 is connected in the manner illustrated in FIG. 7 to permit reversal of the polarity of the current flowing through the winding 14 with respect to the winding 13, as desired. The switch 70 therefore constitutes a reversing switch, and because of the manner in which the rest of the circuit interconnections are made, instantaneous reversal of the direction of rotation of the rotor 15 in all of the embodiments may be effected by switching the pole of the switch 70 from its left position to its right position and vice-versa.

The reversing switch modification of FIG. 7 is particularly useful for large horsepower motors (up to approximately 25 horsepower rating), which typically are controlled by circuits of the type illustrated in the embodiments of FIGS. 3, 4 and 5. In these circuits the magnetic start and disconnect relays which are controlled by the operating windings 25 (FIG. 3) and 40 (FIGS. 4 and 5) can be provided with a manual control (such as the switch 10 in FIG. 3) or automatic control and instant reversal and dynamic breaking of the motor to a full stop is attained with instant capacitor disconnect from the windings as described previously. Thus, even with large horsepower motors, noise vibration of the motor when it is switched to its off position, is eliminated since the capacitors are fully isolated from the operating windings 13 and 14 upon motor disconnect.

Figure 8:
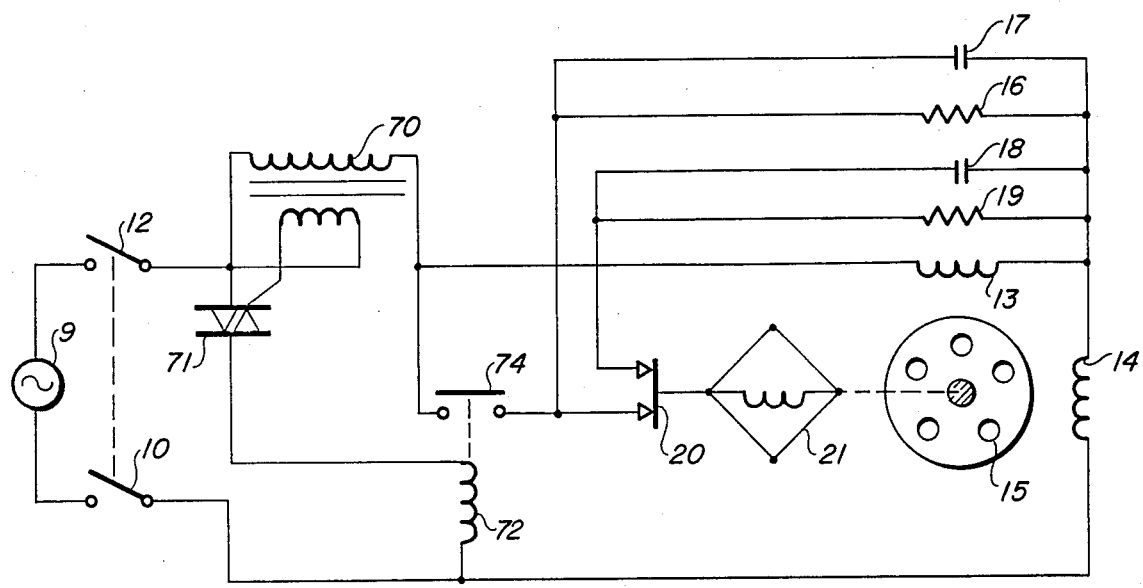
FIGS. 8 and 9 are schematic diagrams of further embodiments of the invention.
Figure 9:
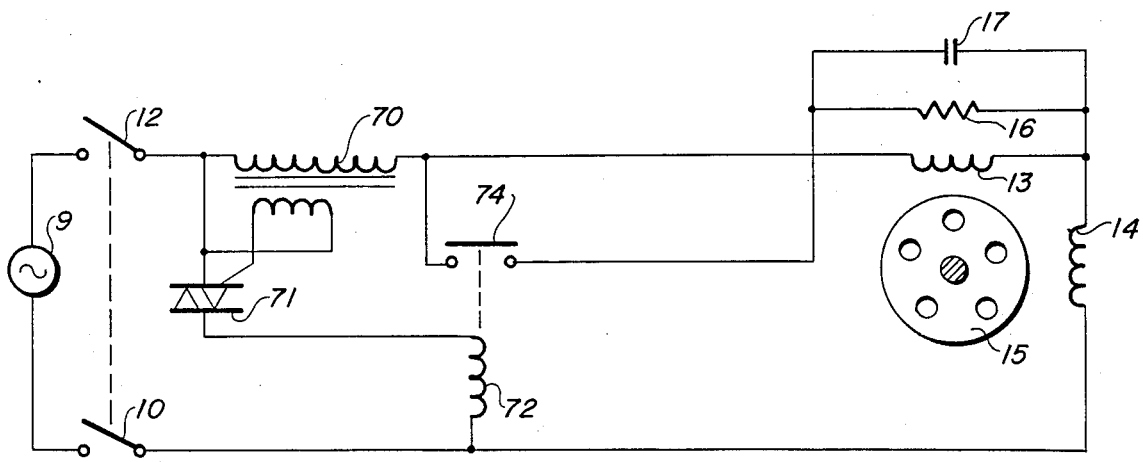

FIGS. 8 and 9 are directed to variations of the circuits of FIGS. of 2 and 1, respectively, but which employ a magnetic relay to connect and disconnect the capacitor 17, forming a portion of the LC resonant circuit, from the circuit in response to operation of the switches 10 and 12. The switches 10 and 12 of the circuit shown in FIG. 8 connect and disconnect the power supply 9 from the motor windings 13 and 14 in the same manner illustrated in the embodiment of FIG. 2. In place of the switch contact 11 for connecting and disconnecting the capacitor 17 from the circuit (as shown in FIG. 2), however, a transformer 70 is used to control the conductivity or gating of a Triac which supplies current through the operating coil 72 of a relay to close a switch 74.

When the switches 10 and 12 are closed, alternating current flows through the windings 13 and 14 in the same manner described previously and also flows through the primary winding of the transformer 70. The anode of the Triac 71 is connected to the junction of the switch 12 and the primary winding of the transformer 70, and the cathode is connected in series with the operating winding 72 to the junction of the switch 10 and the winding 14. Thus, when the switches 10 and 12 are closed, the Triac 71 and the windings 72 are connected in series across the power supply 9. The gate of the Triac 71 is connected to the secondary winding of the transformer 70, and the Triac 71 is rendered nearly instantaneously conductive when the switches 10 and 12 are closed. Upon conduction, the alternating current relay operating winding 72 is provided with operating current and closes the contacts 74. This in turn provides operating current to the capacitor 17 and effectively connects the capacitor 17 in parallel with the winding 13. Thus, an LC resonant circuit, comprising the winding 13 and capacitor 17, is established in the same manner as described previously in conjunction with FIG. 2.

The circuit of FIG. 8 also includes a starting capacitor 18 operated through a pair of switch contacts 20 controlled by a centrifugal switch operator 21. The manner of operation of this portion of the circuit is identical to the operation described above in conjunction with FIG. 2.

When the switches 10 and 12 are opened to disconnect the power supply 9 from the circuit, the gating potential previously supplied by the secondary winding of the transformer 70 to the Triac 71 immediately terminated and the relay coil 72 causes the contacts 74 to be opened to the position shown in FIG. 8. This disconnects the capacitor 17 from the circuit or isolates it from the windings 13 and 14, so that the discharge of the capacitor 17 takes place through the energy dissipating resistor 16 in the manner described previously.

FIG. 9 is a variation of the circuit shown in FIG. 8, but does not include the second or start capacitor 18 and its associated circuitry. The circuit of FIG. 9 is similar to the circuit of FIG. 1, but in place of the switch 11, the transformer 70, Triac 71 and electromagnetic relay, comprising the windings 72 and contacts 74, are used to connect and disconnect the LC resonant circuit capacitor 17. The circuit of FIG. 9, insofar as the operation of the transformer 70, Triac 71 and electromagnetic relay 72, 74 is concerned, operates in the same manner as the circuit of FIG. 8. The remainder of the circuit is identical in structure and operation to the circuit of FIG. 1 described previously.

The foregoing description has been directed to several different specific embodiments of the invention. Various changes and modifications may be made to those embodiments by those skilled in the art without departing from the true scope of the invention. For example, only a limited number of winding configurations and starting switch circuits have been illustrated. Others may be employed. The underlying principle of the invention, that of using a parallel resonant LC circuit comprising one of the motor windings and a capacitor, along with a unique switching means to isolate the capacitor and the winding from one another when the motor is switched off, may be employed in a variety of stator winding configurations.

I claim:

1. An alternating current motor having a stator core for operation from a source of alternating current power, including in combination:
    a rotor for said motor;
    a first winding with first and second ends;
    a second winding with first and second ends, the first end of said second winding connected in series to the second end of said first winding at a first junction on the stator core for inducing rotation of said rotor;
    a source of alternating current power;
    first switch means connected between said source of alternating current power and said series-connected first and second windings for applying alternating current power to said series-connected first and second windings throughout the starting and running operation of said motor when said first switch is closed;
    first capacitor means having first and second terminals, one terminal of which is connected to one of said first and second ends of said first winding;
    second switch means connected between the other terminal of said capacitor means and the other of said ends of said first winding for causing alternating current power to be applied to said capacitor means when both said first and second switch means are closed, said capacitor means thereby connected in parallel with said first winding to form an LC parallel resonant circuit therewith at the frequency of alternating current power applied from said source of alternating current power;
    energy dissipation means connected across the first and second terminals of said first capacitor means at least when said second switch means is open; and
    means for causing said first and second switch means to be opened together and to be closed together, whereby with said second switch means open, said first capacitor means is electrically isolated from said first winding to prevent said first capacitor means for discharging into said first winding.

2. The combination according to claim 1 wherein said source of power is single phase alternating current.

3. The combination according to claim 2 wherein said first and second switch means are electromagnetically actuated in response to activation of said source of alternating current power.

4. The combination according to claim 3 wherein the parameters of said first and second windings, said stator core, and said first capacitor means are selected to cause said stator core to be operated at a flux density near saturation.

5. The combination according to claim 4 further including second capacitor means; third switch means connected in series with said second capacitor means; means for connecting said series-connected third switch means and said second capacitor means in parallel with said first capacitor means; and means coupled with said third switch means for causing said third switch means to be closed during starting of said motor and to be opened during normal load conditions of operation of said motor.

6. The combination according to claim 5 wherein the capacitance of said second capacitor means is substantially greater than the capacitance of said first capacitor means.

7. The combination according to claim 6 wherein said third switch means is a normally closed centrifugal switch coupled with the rotor of said motor, so that upon attainment of a predetermined rotational speed of said rotor, said third switch means is opened to disconnect said second capacitor means from the circuit.

8. The combination according to claim 1 wherein the parameters of said first and second windings, said stator core, and said first capacitor means are selected to cause said stator core to be operated at a flux density near saturation.

9. The combination according to claim 1 wherein said first and second switch means are electromagnetically actuated in response to activation of said source of alternating current power.

10. The combination according to claim 1 further including second capacitor means; third switch means connected in series with said second capacitor means; means for connecting said series-connected third switch means and said second capacitor means in parallel with said first capacitor means; and means coupled with said third switch means for causing said third switch means to be closed during starting of said motor and to be opened during normal load conditions of operation of said motor.

11. The combination according to claim 10 wherein the capacitance of said second capacitor means is substantially greater than the capacitance of said first capacitor means.

12. The combination according to claim 11 wherein said third switch means is a normally closed centrifugal switch coupled with the rotor of said motor, so that upon attainment of a predetermined rotational speed of said rotor, said third switch means is opened to disconnect said second capacitor means from the circuit.

13. The combination according to claim 12 wherein said source of power is a source of single phase alternating current, and said first and second windings are wound with wire of substantially the same size.

14. The combination according to claim 1 including further switch means connected in series circuit between said source of power and said first switch means, closure of said further switch means activating said source of alternating current power; an operating winding; and additional switch means; and wherein said first and second switch means are electromagnetically actuated by said operating winding; said additional switch means being connected in series with said operating winding across said further switch means, closure of said additional switch means causing current to flow through said operating winding to close said first and second switch means when said source of alternating current power is activated by closure of said further switch means.

15. The combination according to claim 1 further including an operating winding wherein at least said second switch means is electromagnetically closed in response to current flow through said operating winding; and a current sensitive circuit connected in series with said first and second windings and coupled with said operating winding for applying current therethrough in response to the alternating current power from said source of power.

16. The combination according to claim 1 further including an operating winding, and a voltage threshold circuit; and wherein said first and second switch means are electromagnetically closed in response to current flow through said operating winding upon activation of said source of alternating current power; said voltage threshold circuit being coupled with said operating coil for removing operating current therefrom in response to instantaneous high peak voltage discharge of said first capacitor means when said source of alternating current power is interrupted and deactivated.

17. The combination according to claim 14 wherein said motor is turned off by operation of either said additional switch means to its open position or said further switch means to the open position thereof.

18. The combination according to claim 14 wherein said source of alternating current power includes a high voltage portion and a low voltage portion, with said further switch means connected between the high voltage portion and said first switch means; and said additional switch means being connected to the low voltage portion of said source of power.

19. The combination according to claim 1 wherein said source of power is a single phase alternating current; said first and second switch means are electromagnetically closed in response to activation of said source of alternating current power; and further including an operating winding for closing said first and second switch means; and third switch means connected in series circuit with said energy dissipation means across the first and second terminals of said first capacitor means, said third switch means being normally closed with said first and second switch means open, said operating winding operating to simultaneously close said first and second switch means and to open said third switch means and operating to simultaneously open said first and second switch means and to close said third switch means in response to deactivation of said source of power to connect said energy dissipation means in parallel with said first capacitor means to provide a discharge path therefor when said first and second switch means are opened.

* * * * *